(12) United States Patent
Vehige et al.

(10) Patent No.: US 7,932,653 B2
(45) Date of Patent: Apr. 26, 2011

(54) ELECTRIC MOTOR ENDSHIELD HAVING VARIABLE BEARING ARRANGEMENT

(75) Inventors: Joseph A. Vehige, St. Louis, MO (US); John H. Hussey, St. Louis, MO (US); Chetan O. Modi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 216 days.

(21) Appl. No.: 12/432,618

(22) Filed: Apr. 29, 2009

(65) Prior Publication Data
US 2010/0277019 A1   Nov. 4, 2010

(51) Int. Cl.
*H02K 5/16*   (2006.01)
(52) U.S. Cl. .......................................... 310/90
(58) Field of Classification Search .............. 310/90; 384/48, 204, 295
See application file for complete search history.

(56) References Cited

U.S. PATENT DOCUMENTS

| | | | |
|---|---|---|---|
| 3,529,874 A | 9/1970 | Hoddy | |
| 4,219,245 A | 8/1980 | Lewis | |
| 4,245,870 A | 1/1981 | Punshon et al. | |
| 4,689,507 A * | 8/1987 | Baker et al. | 310/62 |
| 4,716,327 A | 12/1987 | Stone | |
| 5,002,406 A | 3/1991 | Morton et al. | |
| 5,497,039 A | 3/1996 | Blaettner et al. | |
| 5,505,548 A | 4/1996 | Stewart | |
| 6,247,223 B1 * | 6/2001 | Keck | 29/596 |
| 6,252,321 B1 | 6/2001 | Fisher et al. | |
| 6,648,511 B2 | 11/2003 | Smith et al. | |
| 7,605,508 B2 * | 10/2009 | Baumgartner et al. | 310/90 |
| 2007/0114864 A1 * | 5/2007 | Son | 310/90 |

OTHER PUBLICATIONS

Emerson In-House Parts Drawing depicting prior art Endshield Assembly (Revision dated Jun. 15, 1989).
Emerson In-House Parts Drawing depicting prior art Bearing Sleeve (Revision dated Jun. 23, 1998).

* cited by examiner

*Primary Examiner* — Nguyen N Hanh
(74) *Attorney, Agent, or Firm* — Hovey Williams LLP

(57) ABSTRACT

An electric motor assembly includes a stator assembly and a rotor assembly having a shaft disposed within a motor case. The motor case includes an endshield with a centrally disposed bearing-receiving core that is configured to receive any one of a plurality of bearing assemblies, including at least a ball bearing and a self-aligning bearing, for rotatably supporting the shaft. The core includes a bearing assembly engagement surface with a generally cylindrical first portion and a generally frustoconical second portion, such that any of the selected bearings received therein directly contacts and engages the first surface portion or the second surface portion.

20 Claims, 7 Drawing Sheets

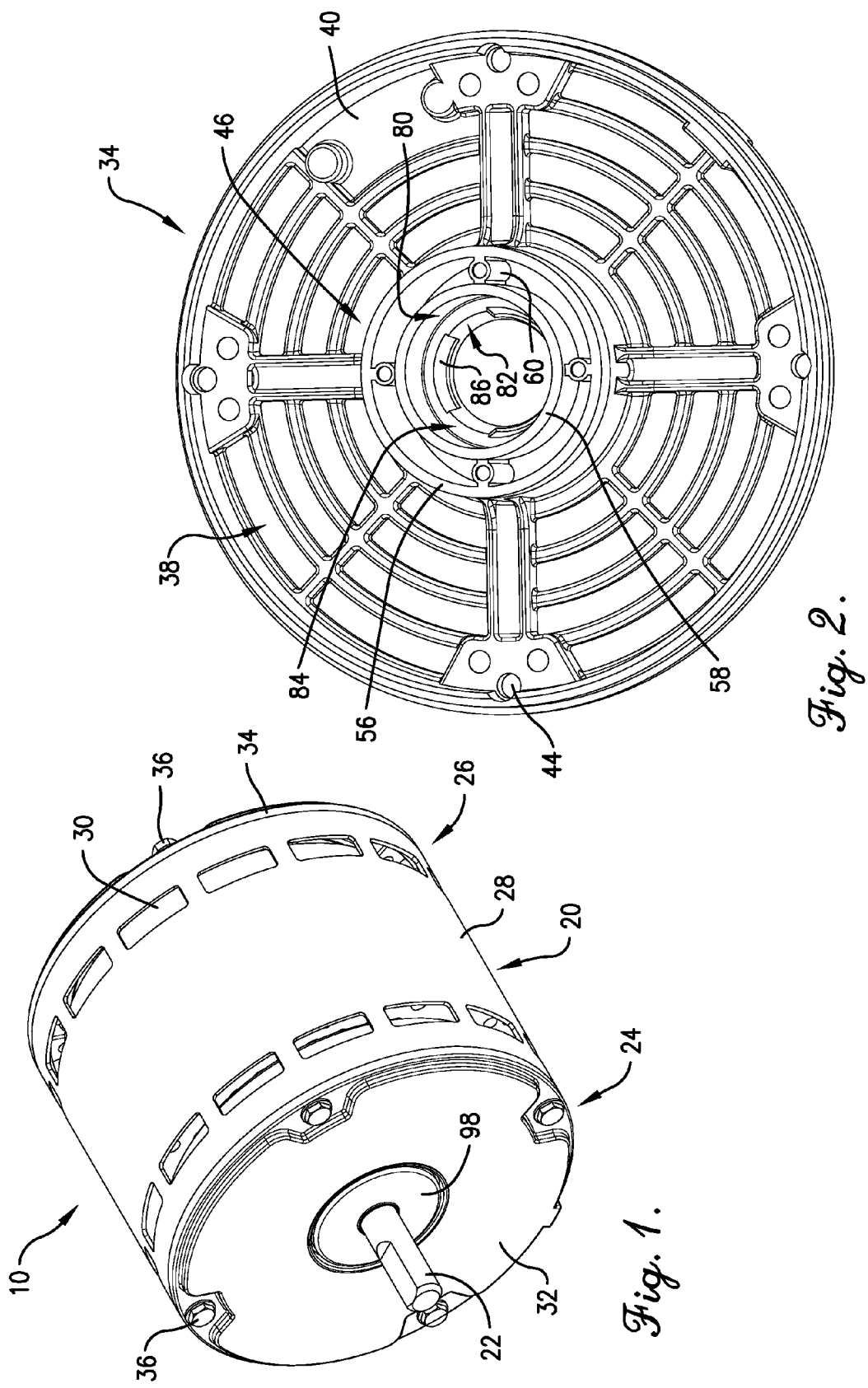

ELECTRIC MOTOR ENDSHIELD HAVING VARIABLE BEARING ARRANGEMENT

BACKGROUND OF THE INVENTION

1. Field of the Invention

The present invention relates generally to an electric motor assembly. More specifically, the present invention concerns an electric motor assembly that includes an endshield having a universal bearing receiving core that can alternatively accept various bearing assemblies to increase design options without requiring additional specialized parts.

2. Discussion of the Prior Art

Those of ordinary skill in the art will appreciate that electric motor assemblies typically include bearings to rotationally support the shaft. There are many different types of bearings, with each type having distinct advantages and disadvantages. Therefore, design requirements often dictate which type of bearing is used in a particular motor assembly. Due in part to the differences in the construction and size of bearing selections, each type of bearing has conventionally required a specialized core or housing in which the bearing is properly positioned for operation.

For example, in a broad range of air moving motors, such as those that would ordinarily power a condenser fan or furnace blower, bearing selection can include at least the options of a self-aligning bearing or a ball bearing. On the one hand, selecting self-aligning bearings may result in quieter operation, as noise generated by the bearing would be undesirably transmitted through the house, but on the other hand, the selection of ball bearings usually results in an assembly that is tougher for handling side loads. Other design considerations may include operating temperature, such as a high temperature requirement for an assembly that will be operating on the roof of a house with hot air coming off of the motor coils. Self-aligning bearings tend to use a lighter weight oil for lubrication purposes and cannot be used in extreme high temperature applications, while ball bearings can use thicker grease for lubrication and can withstand such temperatures.

Conventionally, the selection of one or another type of bearing assembly has required different endshield parts that are individually specialized to accommodate each type of bearing. Even where traditional endshields have attempted to adapt to a more multipurpose construction, such endshields have required complex retaining ring assemblies that are specially tailored for each type of bearing. These systems have lead to the need for extensive inventories of parts to accommodate motor assemblies for varying design considerations.

While such conventional endshield systems have been satisfactory in some respects, those of ordinary skill in the art will also appreciate that the multitude of parts that has been necessary to work with various bearing options is burdensome. Maintaining multiple endshields for different bearings can require die-casting, machining, stocking, shipping, and using two entirely different parts. This has lead to more part variations in machining databases and increases costs, as multiple dies and machining centers are typically required to provide the ability to use either a self-aligning bearing or a ball bearing in a given motor assembly.

The prior art simply does not include an electric motor assembly that can satisfactorily receive and position one of a variety of bearing assemblies without requiring an assortment of specialized endshields or other parts, the production and inventorying of which adds cost and the potential for errors in the assembly of the motor.

SUMMARY

According to an aspect of the present invention, an electric motor assembly is uniquely configured to include one of a plurality of bearing assemblies for rotatably supporting a motor shaft. A motor case houses a stator assembly and a rotor assembly having the shaft. The motor case also includes an endshield with a centrally disposed bearing-receiving core that is configured to receive any one of the plurality of bearing assemblies, with the preferred plurality of bearing assemblies including at least a ball bearing and a self-aligning bearing. The core includes a bearing assembly engagement surface with a generally cylindrical first portion and a generally frustoconical second portion, such that any of the selected bearings received therein directly contacts and engages the first surface portion or the second surface portion of the bearing assembly engagement surface of the core. This universal endshield core allows for multiple motor configurations with various bearing assembly selections to be assembled with the same endshield, eliminating part count and reducing the potential for assembly errors.

According to one aspect of the present invention, an electric motor assembly is provided that includes a rotor assembly rotatable about an axis, with the rotor assembly having a shaft disposed along the axis, and a bearing assembly for rotatably supporting the shaft. The bearing assembly includes a bearing selected from the group consisting of a first bearing presenting a radially outermost periphery that includes a generally constant diameter along the axial span of the periphery and a second bearing presenting a radially outermost periphery that includes a variable diameter that varies along the axial span of the periphery and is less than the diameter of the first bearing. The motor assembly further includes a stator assembly spaced radially from the rotor assembly and a case that defines an internal motor chamber in which the rotor assembly and the stator assembly are housed, with the case presenting opposite axial margins. The case includes an endshield adjacent one of said axial margins. The endshield includes a universal bearing-receiving core configured to receive either one of said first and second bearings, with the core presenting a radially inner periphery that includes a bearing assembly engagement surface.

The engagement surface includes a generally cylindrical first surface portion substantially centered about the axis, with the first surface portion presenting a generally constant diameter along its axial span, the first portion being configured for direct contact and engagement with the radially outermost periphery of the first bearing. The engagement surface also includes a generally frustoconical second surface portion substantially centered about the axis, with the second surface portion presenting a variable diameter that is less than the diameter of the first surface portion along its axial span and tapering radially inwardly toward the axial margin of the case, the second portion being at least partly configured for direct contact and engagement with the radially outermost periphery of the second bearing. The second portion is disposed axially between the first surface portion and the axial margin of the case. The engagement surface includes a generally radially extending stop surface portion defined along a junction of the first and second surface portions. The bearing assembly is received within the core and disposed at least partially against the bearing assembly engagement surface. The bearing assembly engagement surface directly contacts and engages the radially outermost periphery of the bearing such that the first surface portion directly contacts and engages the radially outermost periphery when the first bearing is selected and the second surface portion directly contacts and engages the radially outermost periphery when the second bearing is selected.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is an isometric view of an electric motor assembly constructed in accordance with the principles of a preferred embodiment of the present invention, depicting a case that includes opposite endshields, and a shaft partially extending through one of the endshields;

FIG. 2 is an enlarged, isometric view of one of the endshields of FIG. 1, shown from the interior side, particularly depicting structural details of a central bearing-receiving core;

Figure 6:
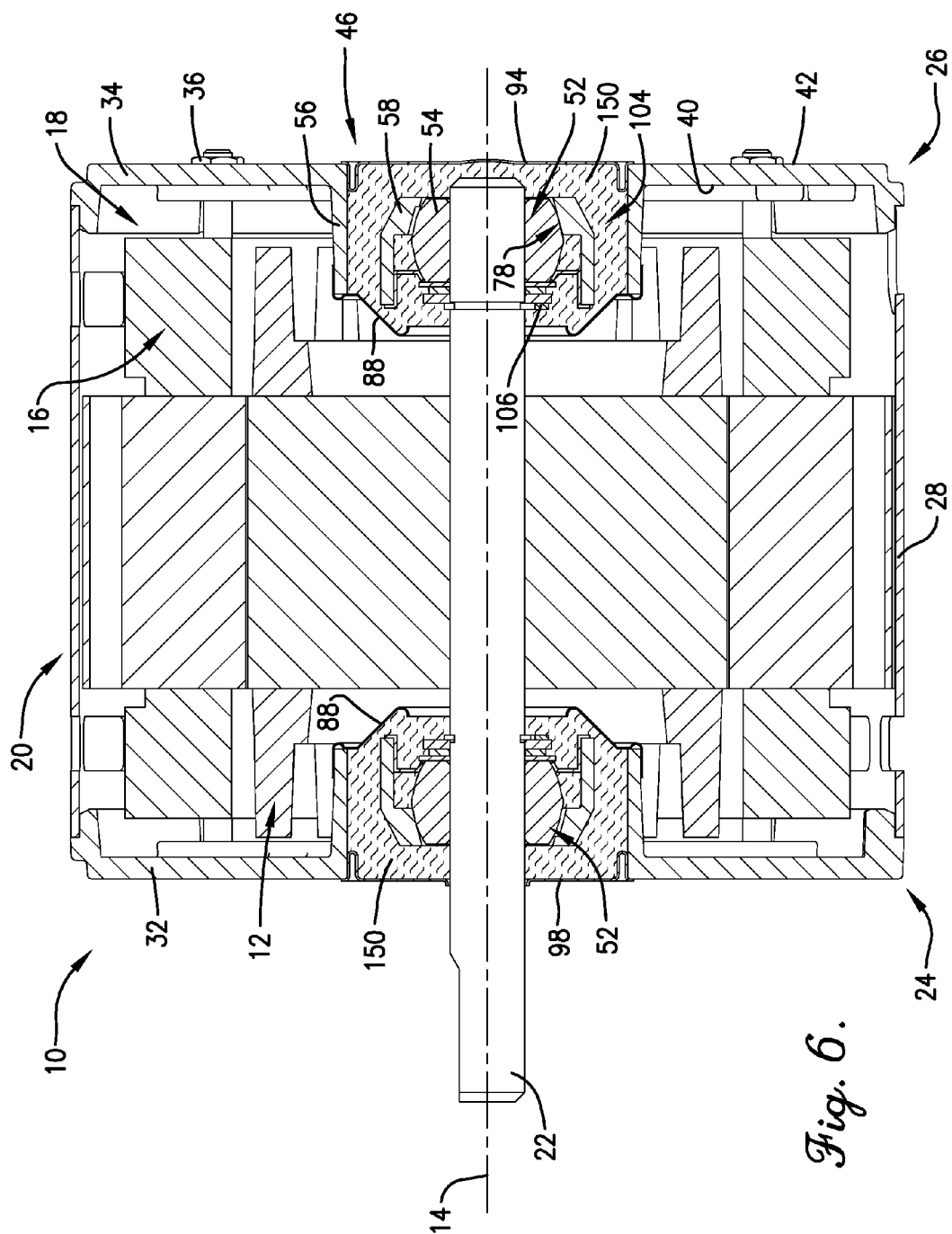
FIG. 6 is an enlarged, side sectional view of the motor assembly of FIG. 1, depicting the internal configuration of the motor assembly and including a self-aligning bearing assembly received in the core of each of the endshields.
Figure 7:
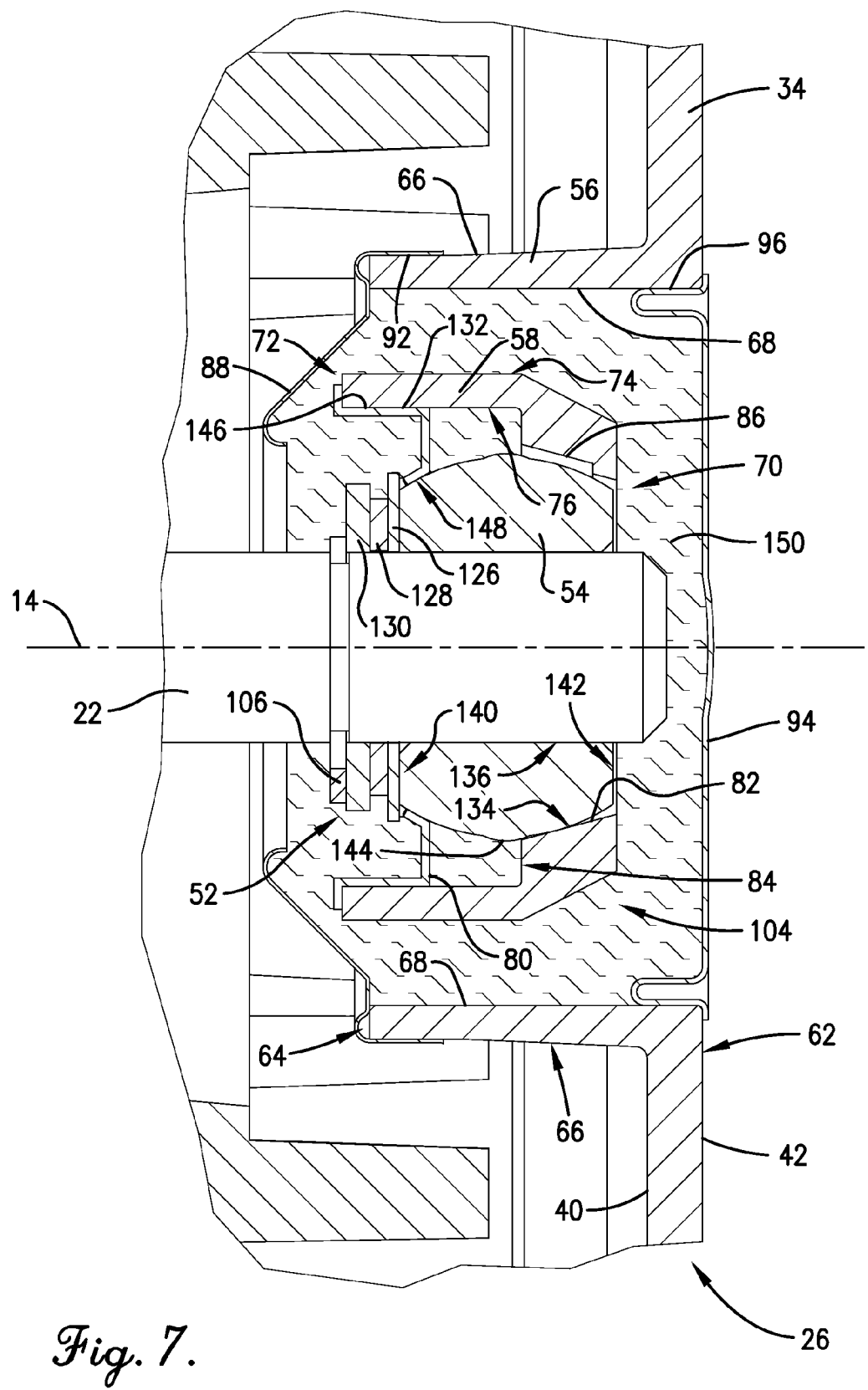
Figure 8:
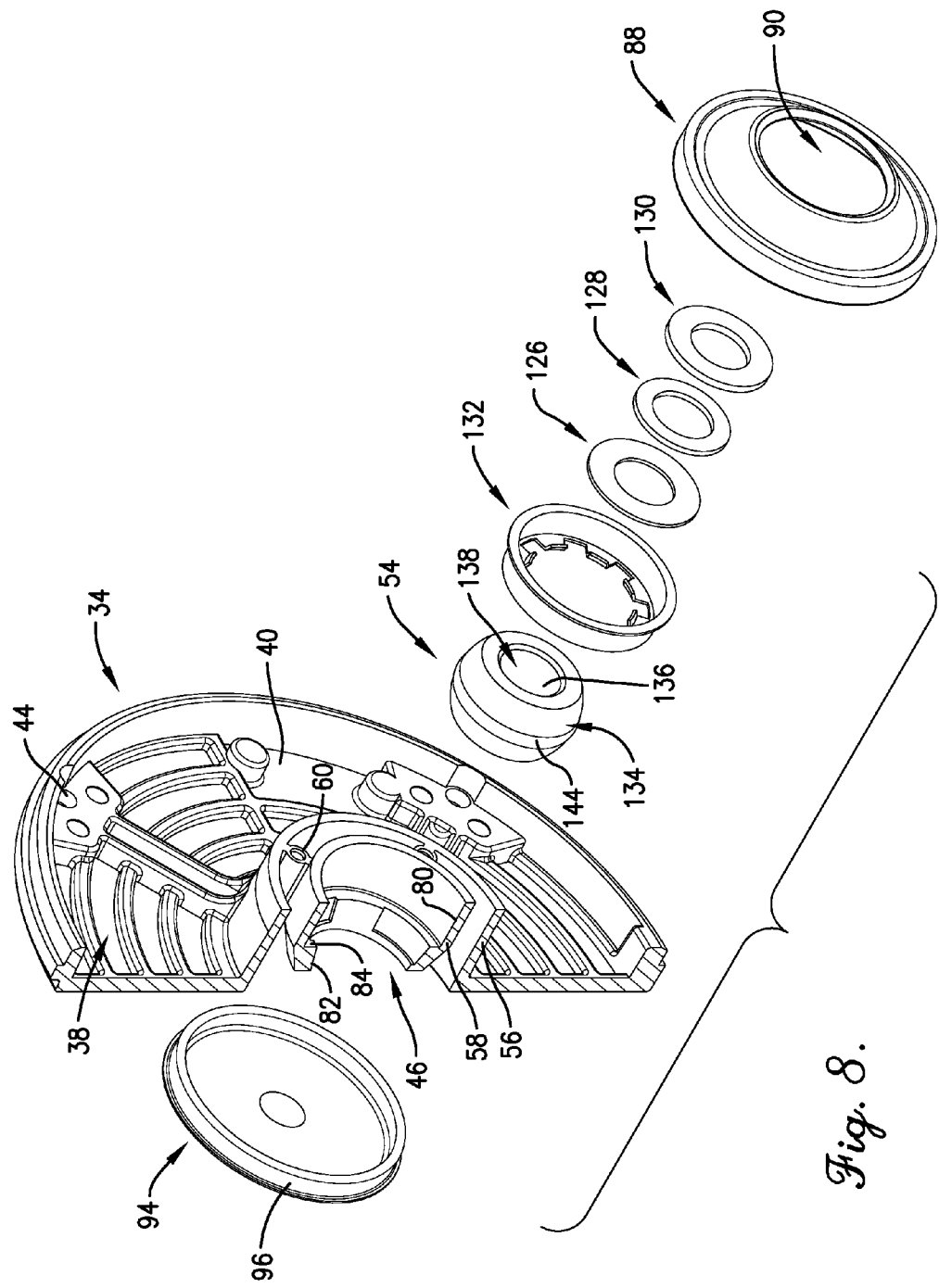

FIG. 7 is an enlarged, fragmentary, partial side sectional view of a portion of the motor assembly as shown in FIG. 6, depicting in detail a central portion of one endshield including the core with the self-aligning bearing assembly received therein; and FIG. 8 is an exploded, partial cutaway view of the endshield and self-aligning bearing assembly as shown in FIG. 7, particularly depicting structural details of construction of the core and elements of the self-aligning bearing assembly.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an electric motor assembly 10 constructed in accordance with a preferred embodiment of the present invention is depicted for use in various applications. As is customary, the motor assembly 10 broadly includes a rotor assembly 12, which is rotatable about an axis 14, and a stator assembly 16 (see FIGS. 3 and 6). The rotor assembly 12 and the stator assembly 16 are both contained within an internal motor chamber 18 that is defined by a motor case 20. The rotor assembly 12 includes an axially disposed shaft 22 that projects outwardly from one end of the motor case 20.

The motor case 20 is generally cylindrical and presents opposite axial margins 24, 26. The motor case 20 comprises a shell element 28 that includes a plurality of exhaust vent openings 30 disposed around a radially outer margin of the shell 28 to present a vented shell 28. It will be readily appreciated by one of ordinary skill in the art, however, that the alternative use of a non-vented shell (not shown) is clearly within the ambit of the present invention. The motor case 20 further comprises endshields 32, 34 disposed adjacent the axial side margins 24, 26, respectively, and secured to the shell 28. In the illustrated embodiment, each endshield 32, 34 is secured to the shell 28 with a plurality of fasteners comprising bolts 36. It will be readily appreciated by one of ordinary skill in the art, however, that either or both of the endshields 32, 34 could be alternatively secured to the shell 28, such as by welding or being integrally formed therewith, without departing from the teachings of the present invention.

The endshields 32, 34 are substantially similar in many respects, with the notable exception that the endshield 32 is predominantly solid, while the endshield 34 includes a plurality of vent openings 38 defined therethrough. The vent openings 38 permit vent air to flow in a generally axial direction from outside to inside the motor chamber 18 to cool the motor assembly 10 from heat generated during operation. As will be readily appreciated by one of ordinary skill in the art upon review of this disclosure, a fan (not shown) that can rotate with the rotor assembly 12 may be used to pull cooling vent air through the vent openings 38, into the chamber 18, and push the air out of the vent openings 30 in the shell 28 in order to provide a cooling effect to the motor assembly 10. In the illustrated embodiment, the vent openings 38 are defined by a grate pattern on the endshield 34. Of course, alternative cooling and/or venting arrangements, including a totally enclosed motor having a non-vented shell (not shown) and endshields without vent openings (such as the solid endshield 32), are contemplated and are clearly within the ambit of the present invention.

It is noted that principles of the present invention that apply to structural details of an endshield apply equally to either the predominantly solid endshield 32 or the venting endshield 34. Due to the vast structural similarities of the endshields 32, 34, only the venting endshield 34 is illustrated in detail (see FIG. 2) and only the venting endshield 34 is described in detail herein. It will be readily appreciated by one of ordinary skill in the art, however, that the following details described with respect to the venting endshield 34 also serve to disclose the same details of construction with respect to the solid endshield 32. It will also be readily appreciated that an alternative motor assembly (not shown) could include two predominantly solid or closed endshields (such as endshield 32) or two venting or open endshields (such as endshield 34), without departing from the teachings of the present invention.

Turning now to FIG. 2, the endshield 34 is generally circular in shape and presents opposite interior and exterior faces 40, 42, respectively. A plurality of holes 44 approximately equidistantly spaced around a circumference of the endshield 34 extend through the endshield 34 from the interior face 40 to the exterior face 42. The holes 44 receive the bolts 36 to facilitate attachment of the endshield 34 to the shell 28 in a manner generally known in the art. The endshield 34 includes a centrally disposed bearing-receiving core 46 that is uniquely configured to receive any one of a plurality of bearing assemblies for rotatably supporting the shaft 22, as described in detail below.

In the illustrated embodiment, the core 46 of the endshield 34 is depicted in detail receiving a first bearing assembly 48 that includes a ball bearing 50 (see FIGS. 3-5) and is also depicted in detail alternatively receiving a second bearing assembly 52 that includes a self-aligning bearing 54 (see FIGS. 6-8). Because the endshield 34 is uniquely configured to receive any one of a plurality of bearing assemblies without further modification to the endshield 34, details of construction of the endshield 34 and the core 46 thereof will first be described independently of any bearing assembly received therein.

With continued reference to FIG. 2, the core 46 broadly includes a radially outer portion 56 and a radially inner portion 58. The radially outer portion 56 and the radially inner portion 58 are connected by a plurality of radially extending ribs 60. In the illustrated embodiment, the core 46 is an integrally formed portion of the endshield 34, with the entire endshield 34 being formed by casting a single piece from aluminum. Alternative materials and/or methods of forming an endshield, however, are clearly within the ambit of the present invention.

Figure 3:
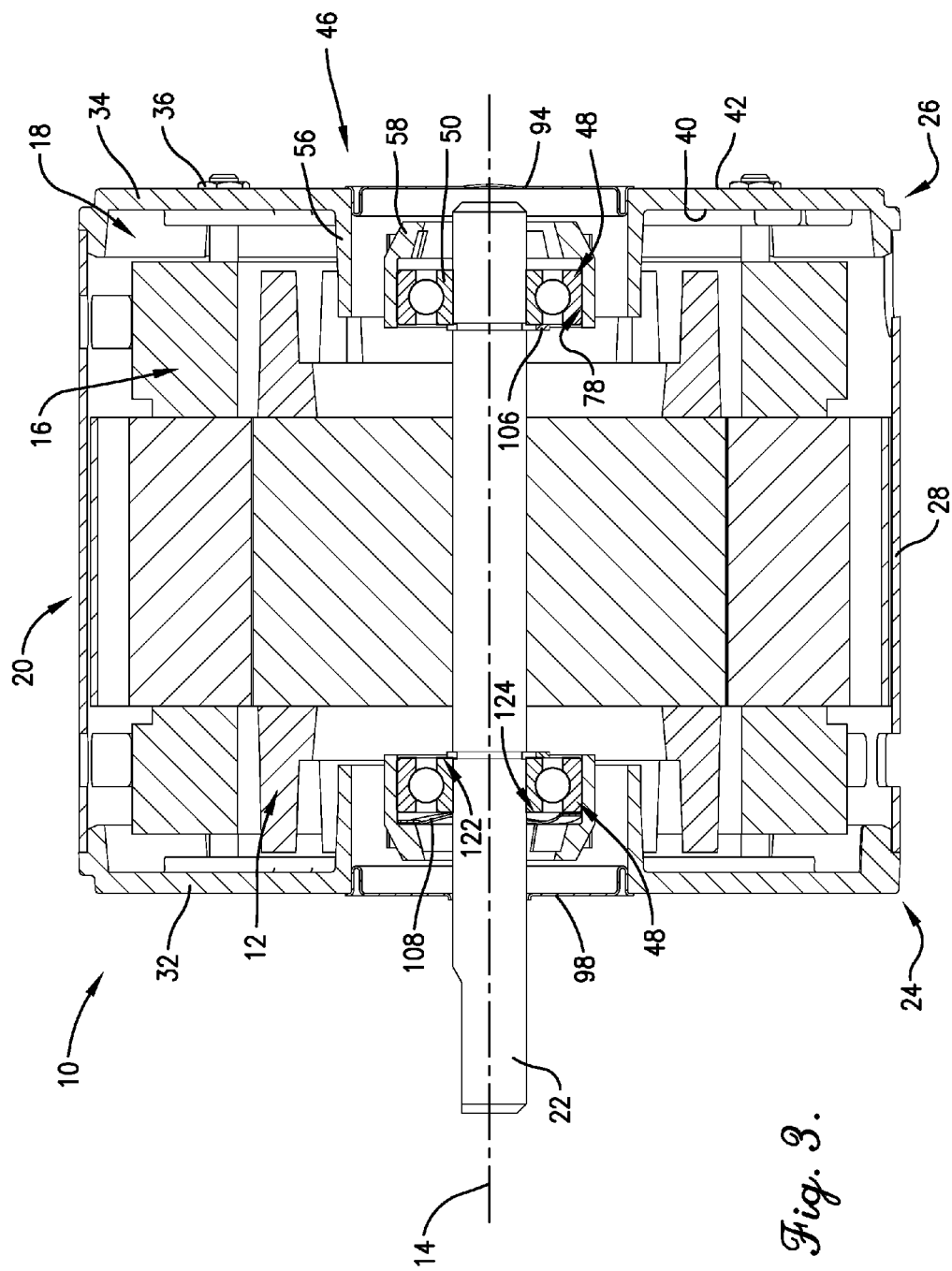
FIG. 3 is an enlarged, side sectional view of the motor assembly of FIG. 1, depicting the internal configuration of the motor assembly and including a ball bearing assembly received in the core of each of the endshields.
Figure 4:
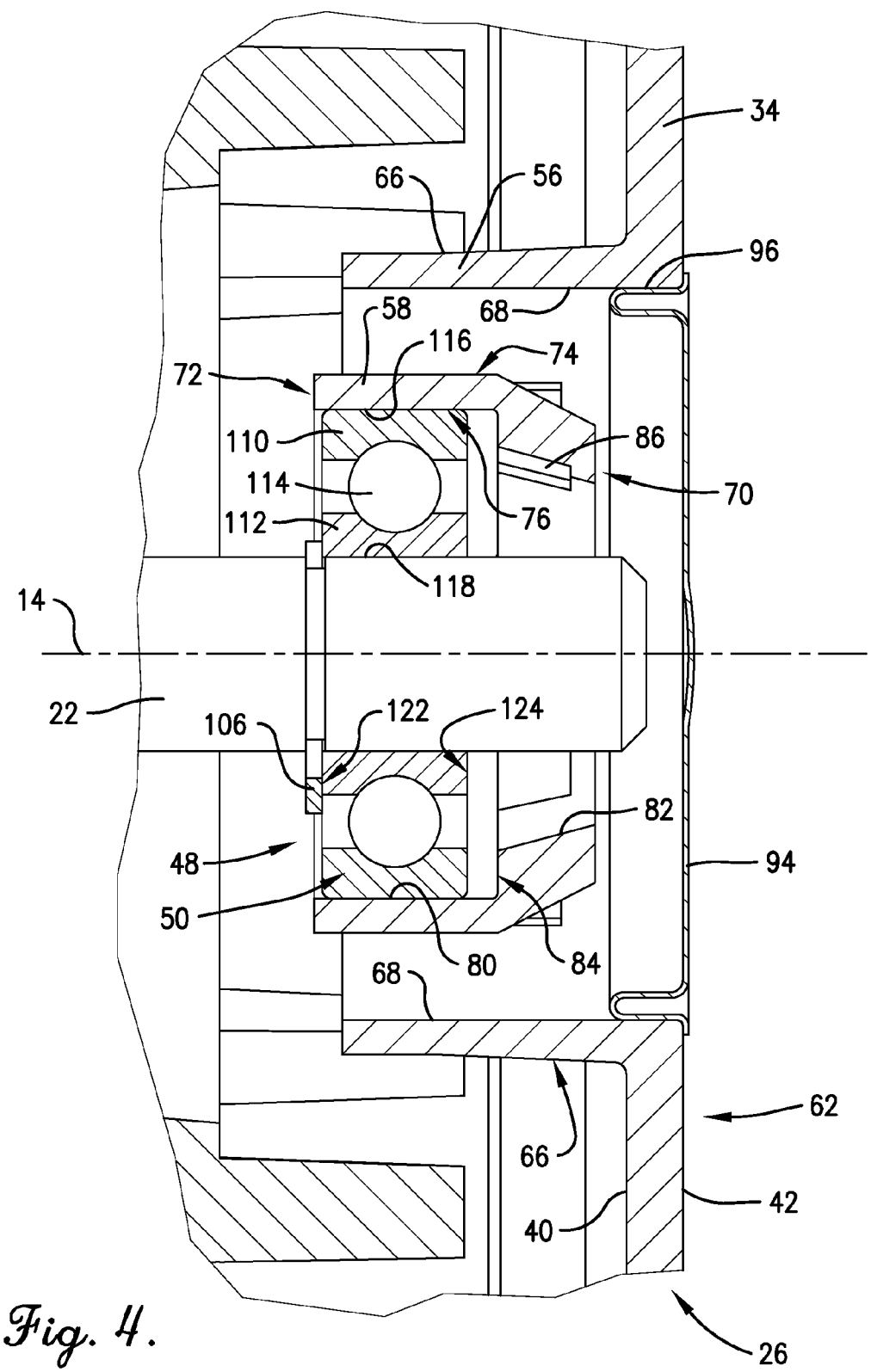
FIG. 4 is an enlarged, fragmentary, partial side sectional view of a portion of the motor assembly as shown in FIG. 3, depicting in detail a central portion of one endshield including the core with the ball bearing assembly received therein.

Turning now to FIGS. 3-8, and in particular to the enlarged fragmentary views of FIGS. 4 and 7, additional structural details of the core 46 will be described. The radially outer portion 56 is generally cylindrical in shape and projects axially into the motor case 20 from an axially exterior margin 62 that is generally radially aligned with the axial margin 26 of the motor case 20 to an axially interior margin 64. The radially outer portion 56 presents a radially outer periphery 66 and a radially inner periphery 68 that are substantially concentric.

The radially inner portion 58 also projects axially into the motor case 20, but is spaced axially inwardly from the axial margin 26 of the motor case 20. The radially inner portion 58 spans axially from an axially exterior margin 70 to an axially interior margin 72, with both margins 70, 72 being spaced axially inwardly from the corresponding margins 62, 64 of the radially outer portion 56. The radially inner portion 58 presents a radially outer periphery 74 and a radially inner periphery 76.

The radially inner periphery 76 of the inner portion 58 presents a bearing assembly engagement surface 78. The bearing assembly engagement surface 78 includes a generally cylindrical first surface portion 80 and a generally frustoconical second surface portion 82. The first surface portion 80 is substantially centered about the axis 14 and presents a generally constant diameter along the axial span of the first surface portion 80, which spans axially from the interior margin 72. The first surface portion 80 is configured for direct contact and engagement with a radially outermost periphery of the ball bearing 50, as described in detail below.

The second surface portion 82 is also substantially centered about the axis 14 and presents a variable diameter that is less than the diameter of the first surface portion 80 along the axial span of the second surface portion 82, which spans axially from the exterior margin 70. In this way, the second surface portion 82 tapers radially inwardly toward the axial margin 26 of the motor case 20. The second surface portion 82 is configured for direct contact and engagement with a radially outermost periphery of the self-aligning bearing 54, as described in detail below.

The bearing assembly engagement surface 78 also includes a generally radially extending stop surface portion 84 that is defined along the junction between the first surface portion 80 and the second surface portion 82. The second surface portion 82 also includes a plurality of recesses 86 that extend radially outwardly. As shown in FIG. 2, the recesses 86 are spaced substantially equidistantly around the second surface portion 82.

Turning now to FIGS. 6-8, and in particular to the enlarged fragmentary view of FIG. 7, an inner cap 88 is operably secured to the axially interior margin 64 of the outer portion 56 of the core 46. As shown in FIG. 8, the inner cap 88 is generally annular in shape and includes an axially aligned hole 90 extending therethrough. With specific reference to FIG. 7, the inner cap 88 also includes an engagement surface 92 that engages a portion of the radially outer periphery 66 of the outer portion 56 of the core 46.

Figure 5:
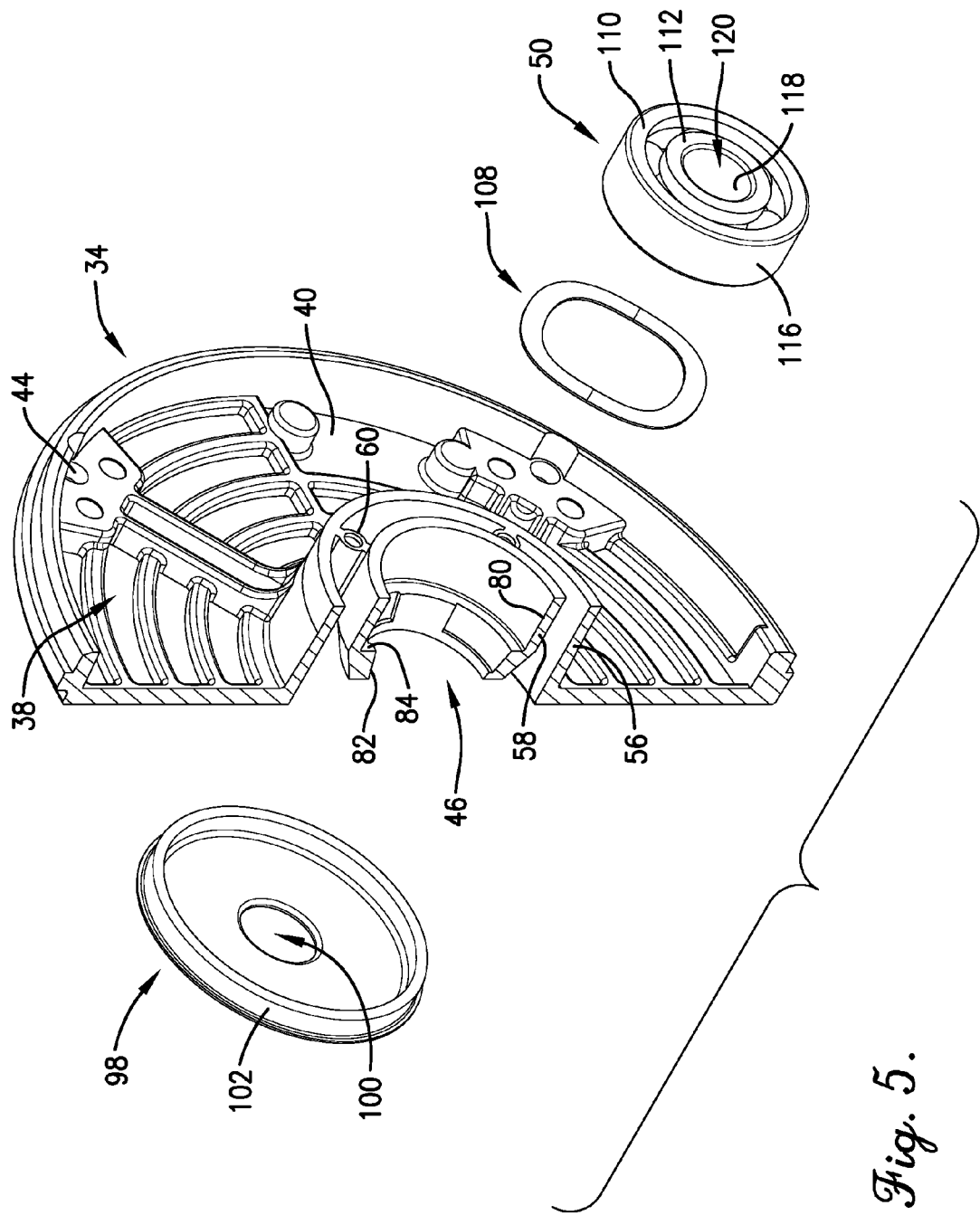
FIG. 5 is an exploded, partial cutaway view of the endshield and ball bearing assembly as shown in FIG. 4, particularly depicting structural details of construction of the core and elements of the ball bearing assembly.

With particular attention to FIGS. 4 and 7, an outer cover 94 is operably secured to the axially exterior margin 62 of the outer portion 56 of the core 46. As shown in FIGS. 5 and 8, the outer cover 94 is generally circular in shape and configured to cover the area along the exterior face 42 of the endshield 34 that corresponds to the core 46. With specific reference to FIGS. 4 and 7, the outer cover 94 includes an axially extending engagement surface 96 that engages a portion of the radially inner periphery 68 of the outer portion 56 of the core 46.

With reference to FIGS. 3 and 6, it is noted that on the end of the motor case 20 where the shaft 22 projects outwardly through the endshield 32 (the shaft through end), an outer cover 98 that includes an axially aligned hole 100 extending therethrough, is used in place of the outer cover 94 such that the shaft 22 projects through the outer cover 98. All other aspects of the outer cover 98 are the same as the outer cover 94, including an axially extending engagement surface 102 that engages a portion of the radially inner periphery 68 of the outer portion 56 of the core 46. Accordingly, redundant description will be avoided here. It is noted that the design of the covers is not critical and alternative arrangements are within the ambit of the present invention.

With reference again to FIG. 7, it can be seen that the combination of the outer portion 56 of the core 46, the inner cap 88, and the outer cover 94 cooperatively define an internal cavity 104, in which the inner portion 58 of the core 46 is disposed. The internal cavity 104 is substantially separated from the remainder of the internal motor chamber 18 by the inner cap 88. The internal cavity 104 is further substantially separated from outside elements by the outer cover 94. It is also specifically noted that the recesses 86 described above form part of the internal cavity 104.

With continued reference to FIGS. 4 and 7, the shaft 22 includes a radially projecting positioning element in the form of a snap ring 106. The snap ring 106 is secured to and axially fixed relative to the shaft 22. As described in detail below, the snap ring 106 is disposed axially adjacent either the first bearing assembly 48 (shown in FIGS. 3-5) or the second bearing assembly 52 (shown in FIGS. 6-8). In this way, the snap ring 106 limits axial movement of the bearing assembly 48, 52 to operably retain receipt of the bearing assembly 48, 52 within the core 46.

It is particularly noted that the snap ring 106 presents a diameter that is less than the diameter of the radially inner periphery 76 of the inner portion 58 of the core 46. In this way, the snap ring 106 is prevented from contacting any portion of the core 46 (including the radially inner periphery 76 of the inner portion 58 and the radially inner periphery 68 of the outer portion 56) when the bearing assembly 48, 52 is received within the core 46.

Turning now to FIGS. 3-5, the first bearing assembly 48 being received in the core 46 will be described in detail. The first bearing assembly 48 broadly includes the ball bearing 50 and selectively includes a spring washer 108 (as shown on the first bearing assembly 48 on the shaft through end), both of which (where the spring washer 108 is included) are received within the core 46, with the ball bearing 50 directly contacting and engaging the first surface portion 80. It is particularly noted that no additional retaining ring or structure is required to be in contact with any portion of the bearing assembly engagement surface 78 in order for the ball bearing 50 to be securely received within the core 46.

The ball bearing 50 includes an outer race 110 and an inner race 112, with a plurality of balls 114 disposed between the races 110, 112. It is noted that a lubricating material (not shown), such as bearing grease, can be included within the ball bearing 50, as will be readily understood by those of ordinary skill in the art. The outer race 110 presents a radially outermost periphery 116 that directly contacts and engages the first surface portion 80 of the bearing assembly engagement surface 78 when the ball bearing 50 is received within the core 46 (as shown in FIGS. 3 and 4). The inner race 112 presents a radially innermost periphery 118 that defines an axially extending bore 120 for receiving the shaft 22 therethrough. In the illustrated embodiment, the radially innermost periphery 118 of the ball bearing 50 is sized such that the ball bearing 50 is operably secured to the shaft 22 in a press-fit arrangement, as will be readily appreciated by one of ordinary skill in the art upon review of this disclosure.

The ball bearing 50 also presents an axially inner margin 122 and an axially outer margin 124. As depicted particularly in FIGS. 3 and 4, when the ball bearing 50 is received within the core 46, the axially inner margin 122 is disposed in an abutting relationship adjacent the snap ring 106 and the axially outer margin 124 is disposed in abutting relationship adjacent the spring washer 108 (on the shaft through end where the spring washer 108 is included). Where the spring washer 108 is included, the spring washer 108 is in turn disposed in an abutting relationship adjacent the stop surface portion 84 of the inner portion 58 of the core 46. In this arrangement, axial movement of the ball bearing 50 is limited so that the ball bearing 50 is maintained in proper position within the core 46. It is again noted that no additional retaining ring or structure is required to maintain the ball bearing 50 in this arrangement.

Next, turning to FIGS. 6-8, the second bearing assembly 52 being received in the core 46 will be described in detail. The second bearing assembly 52 broadly includes the self-aligning bearing 54, a plurality of washers 126, 128, 130, and a retaining element 132, all of which are received within the core 46 with a portion of the self-aligning bearing 54 directly contacting and engaging part of the second surface portion 82. In more detail, the second bearing assembly 52 preferably includes a thrust washer 126 made of steel, a phenolic washer 128 made of a phenolic material, and an end plate washer 130 made of rubber. While this plurality of washers 126, 128, 130 cooperatively maintains the self-aligning bearing 54 in proper position within the core 46 as described in detail below, other washer arrangements (including no washers at all) could alternatively be incorporated into the second bearing assembly 52 without departing from the teachings of the present invention.

The self-aligning bearing 54 presents a radially outermost periphery 134, a portion of which directly contacts and engages the innermost (non-recessed) part of the second surface portion 82 of the bearing assembly engagement surface 78 when the self-aligning bearing 54 is received within the core 46 (as shown in FIGS. 6 and 7). It is noted that an alternative arrangement involving complete contact between the portion of the radially outermost periphery 134 and the part of the second surface portion 82 (i.e., no recesses in the second surface portion 82) is within the ambit of the present invention. The self-aligning bearing 54 also presents a radially innermost periphery 136 that defines an axially extending bore 138 for receiving the shaft 22 therethrough. In the illustrated embodiment, the radially innermost periphery 136 of the self-aligning bearing 54 is sized such that the shaft 22 rotates freely about the interface with the self-aligning bearing 54, with the self-aligning bearing 54 being substantially fixed within the core 46, as will be readily appreciated by one of ordinary skill in the art upon review of this disclosure.

The self-aligning bearing 54 also presents an axially inner margin 140 and an axially outer margin 142. As depicted particularly in FIG. 7, when the self-aligning bearing 54 is received within the core 46, the axially inner margin 140 is disposed in an abutting relationship adjacent the thrust washer 126 and a portion of the outermost periphery 134 directly contacts and engages the second surface portion 82 of the bearing assembly engagement surface 78. In this position, the axially outer margin 142 is disposed in substantial radial alignment with the axially exterior margin 70 of the inner portion 58 of the core 46.

The radially outermost periphery 134 also includes a radially projecting ridge 144 generally centrally located along the axial span of the self-aligning bearing 54. In the illustrated embodiment, the self-aligning bearing 54 is substantially axially symmetrical about the ridge 144. As depicted particularly in FIG. 7, when the self-aligning bearing 54 is received within the core 46, a portion of the radially projecting ridge 144 is disposed adjacent the stop surface portion 84 of the bearing assembly engagement surface 78.

The retaining element 132 comprises a ring that is press-fit into engagement with the axially interior margin 72 of the inner portion 58 of the core 46. In more detail, the retaining element 132 includes an axially extending engagement surface 146 that engages a portion of the radially inner periphery 76 of the inner portion 58 of the core 46. The retaining element 132 further includes a bearing engagement surface 148 that contacts an axially interior portion of the self-aligning bearing 54. In this arrangement, axial movement of the self-aligning bearing 54 is limited so that the self-aligning bearing 54 is maintained in proper position within the core 46. Axial movement of the self-aligning bearing is further restrained by the cooperative relationship of the plurality of washers 126, 128, 130 disposed in abutting relationship between the snap ring 106 and the axially inner margin 140 of the self-aligning bearing 54.

The second bearing assembly 52 further includes a lubricating material 150, such as an oil-soaked cellulose pulp material, that is disposed within the internal cavity 104 of the core 46. In the illustrated embodiment, the self-aligning bearing 54 is formed of a porous metal material. In this arrangement, since the lubricating material 150 is in contact with the self-aligning bearing 54, the lubricant in the form of oil is imparted into the self-aligning bearing 54 and therethrough to the interface between the self-aligning bearing 54 and the shaft 22.

It is particularly noted that oftentimes design constraints may call for a sufficient volume of lubricating material, such as the oil-soaked cellulose pulp 150, in order to adequately lubricate the self-aligning bearing 54 throughout its useful life. With this in mind, and with attention specifically to FIG. 7, it is clear that the open nature of the internal cavity 104 of the core 46 permits a sufficient volume of lubricating material to be disposed therein. In addition, it is also noted that because the recesses 86 form part of the internal cavity 104, the lubricating material 150 is in contact with a portion of the radially outermost periphery 134 of the self-aligning bearing 54 along a substantial majority of the axial span of the self-aligning bearing 54. It is believed that such contact between the self-aligning bearing 54 and the lubricating material 150 may increase the useful life of the bearing assembly 52.

It is again emphasized that the structural configuration of the core 46, described in detail above, is such that one of a plurality of types of bearing assemblies can be securely received therein with the selected bearing having a radially outermost periphery, a portion of which is directly contacting and engaging a corresponding portion of the bearing assembly engagement surface 78. Thus, as will be readily appreciated by one of ordinary skill in the art upon review of this disclosure, the motor assembly 10 described above can take the form of a kit whereby multiple motors can be assembled with different bearing assemblies based on design requirements. In such a case, the various assemblies can each incorporate the endshield 34 (or the endshield 32) with the core 46 as described in detail above to securely receive one of a plurality of different bearing assemblies without the need for additional or specialized endshields.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor assembly comprising:
a rotor assembly rotatable about an axis,
said rotor assembly including a shaft disposed along the axis;
a bearing assembly for rotatably supporting the shaft,
said bearing assembly including a bearing selected from the group consisting of a first bearing presenting a radially outer periphery that has a generally constant diameter along the axial span of the periphery and a second bearing presenting a radially outer periphery that has a variable diameter that varies along the axial span of the periphery;
a stator assembly spaced radially from the rotor assembly;
a case defining an internal motor chamber in which the rotor assembly and the stator assembly are housed, with the case presenting opposite axial margins,
said case including an endshield adjacent one of said axial margins,
said endshield including a universal bearing-receiving core configured to receive either one of said first and second bearings,
said core presenting a radially inner periphery that includes a bearing assembly engagement surface,
said engagement surface including a generally cylindrical first surface portion substantially centered about the axis, with the first surface portion presenting a generally constant diameter along its axial span, the first portion being configured for direct contact and engagement with the radially outer periphery of the first bearing,
said engagement surface including a generally frustoconical second surface portion substantially centered about the axis, with the second surface portion presenting a variable diameter along its axial span and tapering radially inwardly toward the axial margin of the case, the second portion being at least partly configured for direct contact and engagement with the radially outer periphery of the second bearing,
said bearing assembly being received within the core and disposed at least partially against the bearing assembly engagement surface,
said bearing assembly engagement surface directly contacting and engaging the radially outer periphery of the bearing such that the first surface portion directly contacts and engages the radially outer periphery when the first bearing is selected and the second surface portion directly contacts and engages the radially outer periphery when the second bearing is selected.

2. The electric motor assembly as claimed in claim 1, said first bearing comprising a ball bearing.

3. The electric motor assembly as claimed in claim 2, said ball bearing including an outer race that presents the radially outer periphery,
said outer periphery of the ball bearing directly contacting and engaging the first surface portion of the bearing assembly engagement surface,
said ball bearing being securely received within the core without a retainer being disposed in contact with the bearing assembly engagement surface.

4. The electric motor assembly as claimed in claim 3, said shaft including a radially projecting positioning ring operably secured thereto and axially fixed relative to the shaft,
said positioning ring being disposed axially adjacent the ball bearing to limit axial movement of the bearing and maintain receipt of the bearing within the core,
said positioning ring having a diameter that is less than the diameter of the first surface portion of the bearing engagement surface such that the positioning ring is prevented from contacting the radially inner periphery of the core when the bearing is received within the core.

5. The electric motor assembly as claimed in claim 4, said engagement surface including a generally radially extending stop surface portion defined along a junction of the first and second surface portions,
said bearing assembly further including a spring washer,
said spring washer being axially disposed between the ball bearing and the stop surface portion of the bearing assembly engagement surface.

6. The electric motor assembly as claimed in claim 5; and an outer cover operably secured to an axially exterior margin of the core to substantially separate an internal cavity of the core from outside elements.

7. The electric motor assembly as claimed in claim 1, said second bearing comprising a self-aligning bearing.

8. The electric motor assembly as claimed in claim 7, said shaft including a radially projecting positioning ring operably secured thereto and axially fixed relative to the shaft,
said positioning ring being disposed axially adjacent the bearing assembly to limit axial movement of the bearing and maintain receipt of the bearing within the core,
said positioning ring having a diameter that is less than the diameter of the first surface portion of the bearing engagement surface such that the positioning ring is prevented from contacting the radially inner periphery of the core when the bearing is received within the core.

9. The electric motor assembly as claimed in claim 8,
said bearing assembly further including a retaining element operably secured to an axially interior margin of the core such that the retaining element is axially fixed relative to the core,
said retaining element including a bearing engagement surface that contacts and engages an axially interior portion of the radially outer periphery of the self-aligning bearing to limit axial movement of the self-aligning bearing within the core.

10. The electric motor assembly as claimed in claim 8,
said bearing assembly further including at least one washer disposed axially between the self-aligning bearing and the positioning ring to limit axial movement of the self-aligning bearing within the core.

11. The electric motor assembly as claimed in claim 7,
said core including a radially inner portion and a radially outer portion with the portions being generally concentric and connected to one another by a plurality of radially spanning ribs,
said radially inner portion including the bearing assembly engagement surface;
an inner cap operably secured to an axially interior margin of the radially outer portion to substantially separate the core from the remainder of the internal motor chamber; and
an outer cover operably secured to an axially exterior margin of the radially outer portion to substantially separate the core from outside elements,
said radially outer portion of the core, said inner cap, and said outer cover cooperatively defining an internal cavity of the core.

12. The electric motor assembly as claimed in claim 11,
said bearing assembly further including a lubricating material disposed within the internal cavity of the core.

13. The electric motor assembly as claimed in claim 12,
said self-aligning bearing being formed of a porous metal material,
said lubricating material contacting the self-aligning bearing such that lubricant is imparted therethrough to the interface between the shaft and the self-aligning bearing.

14. The electric motor assembly as claimed in claim 13,
said lubricating material comprising an oil-soaked cellulose pulp material.

15. The electric motor assembly as claimed in claim 12,
said second surface portion of the core including at least one radially outwardly extending and axially spanning recess defined therein,
said recess thereby forming part of the internal cavity such that the lubricating material is disposed within the recess and in contact with the outer periphery of the self-aligning bearing.

16. The electric motor assembly as claimed in claim 15,
said second surface portion of the core including a plurality of said recesses,
said recesses being spaced substantially equidistantly around the second surface portion of the core.

17. The electric motor assembly as claimed in claim 7,
said second surface portion being disposed axially between the first surface portion and the axial margin of the case,
said engagement surface including a generally radially extending stop surface portion defined along a junction of the first and second surface portions,
said self-aligning bearing including a radially projecting ridge,
said ridge being axially disposed adjacent the stop surface portion of the bearing assembly engagement surface.

18. The electric motor assembly as claimed in claim 1,
said core being generally radially centrally disposed along the endshield,
said shaft extending axially at least partially through the center of the core.

19. The electric motor assembly as claimed in claim 1,
said core being integrally formed with the endshield.

20. An electric motor assembly comprising:
a rotor assembly rotatable about an axis,
said rotor assembly including a shaft disposed along the axis;
a bearing assembly for rotatably supporting the shaft,
said bearing assembly including a bearing selected from the group consisting of a retainerless ball bearing and a self-aligning bearing;
a stator assembly spaced radially from the rotor assembly;
a case defining an internal motor chamber in which the rotor assembly and the stator assembly are housed, with the case presenting opposite axial margins,
said case including an endshield adjacent one of said axial margins,
said endshield including a universal bearing-receiving core configured to receive either one of said bearings,
said core presenting a radially inner periphery that includes a bearing assembly engagement surface substantially centered about the axis,
said engagement surface including a first surface portion configured for direct contact and engagement with a radially outer periphery of the ball bearing, such that the ball bearing is secured within the core devoid of any retainer,
said engagement surface including a second surface portion at least partly configured for direct contact and engagement with a radially outer periphery of the self-aligning bearing,
said bearing assembly being received within the core and disposed at least partially against the bearing assembly engagement surface,
said bearing assembly engagement surface directly contacting and engaging the radially outer periphery of the bearing such that the first surface portion directly contacts and engages the radially outer periphery when the ball bearing is selected and the second surface portion directly contacts and engages the radially outer periphery when the self-aligning bearing is selected.

\* \* \* \* \*